United States Patent [19]

Lee et al.

[11] Patent Number: 4,814,606
[45] Date of Patent: Mar. 21, 1989

[54] PHOTODETECTOR ASSEMBLY FOR A LASER SCANNING APPARATUS

[75] Inventors: Jerald D. Lee, Mendenhall, Pa.; John G. Elias, Wilmington, Del.; Bennett H. Rockney, Westford, Mass.; William E. Wolf, Chesapeake City, Md.

[73] Assignee: E. I. Du Pont de Nemours and Company, Wilmington, Del.

[21] Appl. No.: 160,002

[22] Filed: Feb. 24, 1988

Related U.S. Application Data

[63] Continuation-in-part of Ser. No. 34,527, Apr. 3, 1987, which is a continuation-in-part of Ser. No. 798,539, Nov. 15, 1985, abandoned.

[51] Int. Cl.$^4$ .............. H01J 3/14; H04N 1/04
[52] U.S. Cl. .................... 250/235; 358/292
[58] Field of Search ............... 250/235, 227, 578; 358/285, 292; 350/96.1

[56] References Cited

U.S. PATENT DOCUMENTS

| | | | |
|---|---|---|---|
| 2,532,799 | 12/1950 | Young | 178/7.1 |
| 2,567,307 | 9/1951 | Wise et al. | 178/7.1 |
| 2,569,648 | 10/1951 | Artzt et al. | 178/7.1 |
| 2,894,063 | 7/1959 | Ridings et al. | 178/6.6 |
| 2,894,065 | 7/1959 | Wise et al. | 178/7.1 |
| 3,142,224 | 7/1964 | Andrews et al. | 88/24 |
| 3,370,504 | 2/1968 | Buck et al. | 88/24 |
| 3,449,561 | 6/1969 | Basil et al. | 240/103 |
| 3,600,507 | 8/1971 | Newgard | 178/6 |
| 3,741,664 | 6/1973 | Torin | 356/203 |
| 3,953,859 | 4/1976 | Locke | 346/1 |
| 4,179,100 | 12/1979 | Sashin et al. | 250/416 |
| 4,206,482 | 6/1980 | DeLavalette et al. | 358/290 |
| 4,278,803 | 3/1988 | Catchpole et al. | 358/213.15 X |
| 4,326,222 | 4/1982 | Connin et al. | 358/292 |
| 4,525,749 | 6/1985 | Maeda et al. | 358/290 |
| 4,676,582 | 6/1987 | Kato et al. | 350/6.5 |

Primary Examiner—Eugene R. LaRoche
Assistant Examiner—David Mis
Attorney, Agent, or Firm—John E. Griffiths

[57] ABSTRACT

A laser scanning apparatus is characterized by a curved film-receiving field with a conforming photodetector assembly. In one embodiment, the photodetector assembly comprises a plurality of semiconductor elements. In other embodiments, the photodetector assembly includes a photodetector device mounted in light transmissive engagement with a transparent block for receiving light passed through a radiographic film.

61 Claims, 13 Drawing Sheets

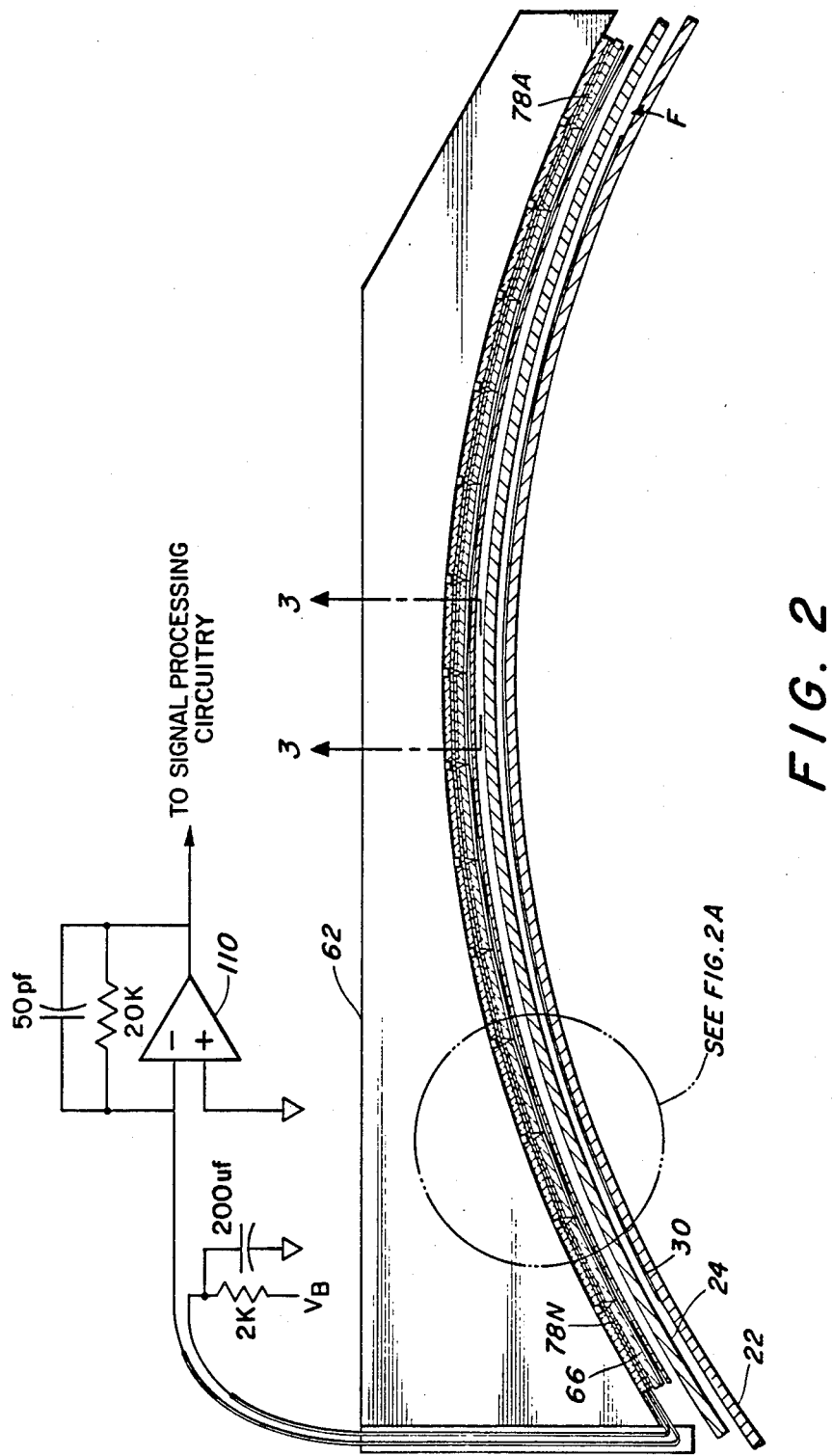

PHOTODETECTOR ASSEMBLY FOR A LASER SCANNING APPARATUS

CROSS REFERENCE TO RELATED APPLICATION

This application is a continuation-in-part of patent application Ser. No. 034,527 filed on Apr. 3, 1987 which is a continuation-in-part of patent application Ser. No. 798,539 filed on Nov. 15, 1985, now abandoned.

FIELD OF THE INVENTION

The present invention relates to a laser scanning apparatus for scanning a radiograph, and in particular to a laser scanning apparatus in which the radiograph is supported on a curved field and which includes a curvilinear photodetector assembly.

DESCRIPTION OF THE PRIOR ART

Laser scanning apparatus for scanning a radiograph and digitizing the same for electronic analysis and transmission is known. Exemplary of such apparatus is that manufactured by E. I. du Pont de Nemours and Company. Inc. as the Film Digital Radiography System.

Such apparatus uses a galvanometer based oscillating mirror to direct a beam of interrogating radiation across the surface of a radiograph. The radiograph is supported on a planar surface, or platen. Mounted above the platen in a position to receive the radiation transmitted through the radiograph is a linear semiconductor photodetector. The photodetector is fabricated from a plurality of PIN semiconductor diode strips placed edge-to-edge in a planar orientation. An optical diffuser is disposed between the diodes and the platen.

Such scanners have certain limitations associated therewith. As the interrogating beam scans across the planar radiograph, the path length to the radiograph changes causing the size of the spot of radiation to vary. Since the mirror scans at constant angular velocity, the velocity of the spot along the planar radiograph varies. This causes a geometric distortion of the acquired image. Because the beam impinges on the radiograph at a varying angle, the shape of the spot of incident radiation is also distorted, thus degrading resolution. Further, due to the increased pathlength through the edges of the radiograph increases in the absorption of the beam are known to occur. These effects combine to produce a digitized image that is darker and of lower resolution at the lateral edges. This is perceived as disadvantageous.

In addition to the above, the prior system is slow, taking approximately one minute to scan a typical radiograph, owing primarily to the limited speed of oscillation of the galvanometer mirror.

Curved fields are known in the facsimile arts, as evidenced by U.S. Pat. No. 3,370,504. This patent discloses a facsimile apparatus which has a curved field and which has positioned therebehind a photodetector assembly having a correspondingly curved array of optical fibers. The fibers conduct the transmitted radiation to a single photodetector device, typically a photomultiplier tube. A recognized limitation of such an arrangement is a limited signal to noise ratio due to the noise introduced by the irregular effects resulting from the light passing from one optical fiber to the next.

Because of the above-mentioned limitations the use of such fiber optic arrays is presently not believed to be advantageous for high precision medical uses such as the scanning of radiographs.

SUMMARY OF THE INVENTION

The present invention relates to a photodetector assembly for a laser scanning apparatus. The laser scanning apparatus includes a support arrangement that defines a curved field for receiving a radiograph to be scanned by radiation produced from a laser source. Means, such as a rotatable multifaceted mirror and beam forming optics, is provided to produce a focussed beam of interrogating radiation on the radiograph. The source and beam forming means are mounted on a gantry that is displaceable with respect to the field to cause the beam to scan the field in raster fashion. The photodetector assembly is positioned with respect to the field to receive radiation transmitted through the radiograph.

The photodetector assembly in a first embodiment of the invention, includes a photodetector device itself comprised of a plurality of semiconductor elements connected electrically in parallel and physically arranged in edge-to-edge abutting relationship. The semiconductor elements are arranged in a curvilinear pattern with each being substantially equally spaced from the field. A slit mask may be mounted intermediate the field and the photodetector assembly.

In a second embodiment of the invention the photodetector assembly comprises a transparent block and a photodetector device mounted thereto. The block has a front input end surface and a back output end surface. Both the front surface and the back surface have opposed pairs of major and minor edges. The front input end surface being curvilinear in shape with all points on the curvilinear end surface being equally spaced from the field. A pair of edge surfaces extends between corresponding minor edges of the front and back surfaces. A pair of side surfaces extends between corresponding major edges of the front and back surfaces. The photodetector device is mounted in light transmissive engagement with the back output end surface of the block. The photodetector device has a predetermined active area associated therewith while the back end surface is sized to efficiently couple light to the active area of the photodetector device. A neutral density optical filter is disposed intermediate the curved field and the photodetector assembly, the filter having a density gradient to normalize the response of the photodetector assembly across the input surface thereof.

In a third embodiment of the invention the photodetector assembly again comprises a transparent block and a photodetector device mounted thereto. The block has a front input end surface, a back reflecting surface, and a first and a second side surface. The photodetector device is mounted in light transmissive engagement with one of the side surfaces. The input end surface is curvilinear in shape with all points on the curvilinear surface being equally spaced from the field. Each side surface, when viewed in a direction parallel to an axis extending perpendicular to the side surface, has a perimeter comprised of a circular arc and an arc of a conic section. Preferably the conic section is an ellipse and the arc included in the perimeter of the block surrounds at least one focus thereof. The photodetector device is mounted to the side surface substantially at that focus. The back reflecting surface is shaped such that the intersection of the back surface with a plane perpendicular to the side surface on which the photodetector device is mounted is either a straight line or a conic section. The back surface is arranged to reflect light incident thereon to the photodetector device. Alternately stated, the block may be defined as that volume or segment of an ellipsoid containing one of the foci thereof that is produced by the intersection of the ellipsoid with two parallel planes, one of which contains both foci, and a right circular cylinder the axis of which is perpendicular to both planes and which passes through the other of the foci, the radius of the cylinder being less than the distance between the foci. As in the case of the second embodiment a neutral density optical filter is also disposed intermediate the curved field and the photodetector assembly.

In a fourth embodiment of the invention the photodetector assembly comprises a transparent block and a photodetector device mounted thereon. The block has a front input end surface, a back reflecting surface, and a first and a second side surface. The photodetector device is mounted in light transmissive engagement with a first one of the side surfaces. The input end surface is curvilinear in shape with all points on the curvilinear surface being equally spaced from the field. The second side surface, when viewed in a direction parallel to an axis extending perpendicular to the second side surface, has a perimeter comprised of a circular arc and an arc of a conic section. Preferably the conic section is an ellipse. In contrast with previous embodiments, directing means is positioned on the second side surface substantially at one focus of the ellipse. Further, the directing means is a reflective indentation substantially centered on a line intersecting that focus and perpendicular to the second side surface. The photodetector device is mounted to the first side surface substantially centered on the perpendicular line. The back reflecting surface is shaped such that the intersection of the back surface with a plane perpendicular to the side surfaces is either a straight line or a conic section. The back surface is arranged to reflect light to the directing means which directs light to the photodetector device. The reflective indentation preferably has the shape of a truncated cone. Alternately stated, the block can be defined as that volume or segment of an ellipsoid containing one of the foci thereof that is produced by the intersection of the ellipsoid with two parallel planes, one of which contains both foci, and a right circular cylinder the axis of which is perpendicular to both planes and which passes through the other of the foci. The radius of the cylinder is less than the distance between the foci. As in the case of the second and third embodiments, a neutral density optical filter may be also disposed intermediate the curved field and the photodetector assembly.

Any of the above described embodiments of the photodetector assembly may be used in conjunction with a curved field formed by a pair of spaced, coaxial, curved plates. The curved field defined by the plates receives the radiograph to be scanned. One of the plates may be formed of an optically diffuse material.

BRIEF DESCRIPTION OF THE DRAWINGS

The invention may be more fully understood from the following detailed description thereof taken in connection with accompanying drawings which form a part of this application and in which:

FIG. 2 is a side elevation partially in section of the embodiment of a photodetector assembly shown in FIG. 1 illustrating the spatial relationship of the photodetector assembly and the field of the laser scanning apparatus;

DETAILED DESCRIPTION OF THE INVENTION

Figure 1:
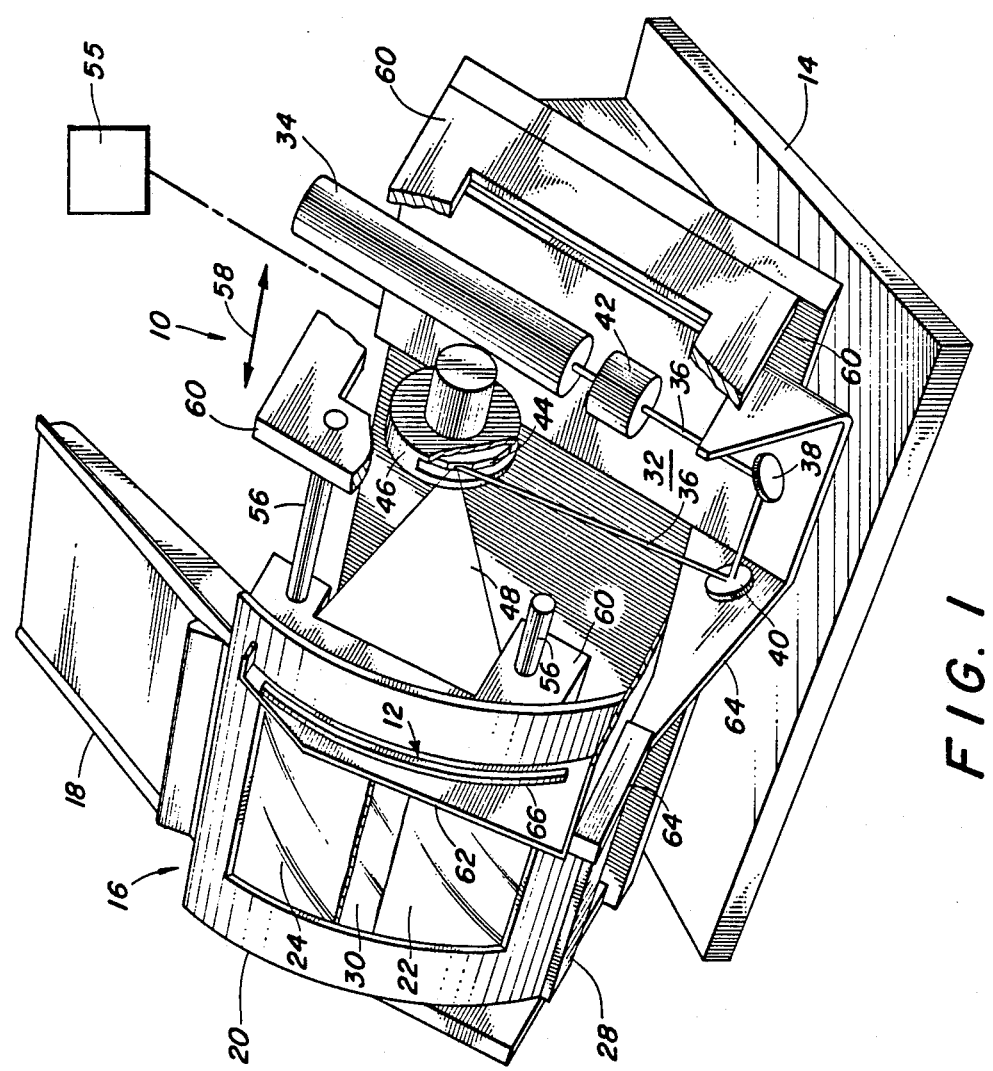
FIG. 1 is a highly stylized pictorial representation of a laser scanning apparatus having a photodetector assembly in accordance with a first embodiment of the present invention.

Throughout the following detailed description similar reference numerals refer to similar elements in all figures of the drawings.

FIG. 1 shows a highly stylized pictorial representation of a laser scanning apparatus or scanner 10 having mounted thereon a photodetector assembly generally indicated by reference character 12 in accordance with the present invention. The scanner 10 itself includes a base 14 that supports a film guide generally indicated by reference character 16. The film guide 16 includes an inlet chute 18 that communicates with a curved film support arrangement 20.

Figure 2A:
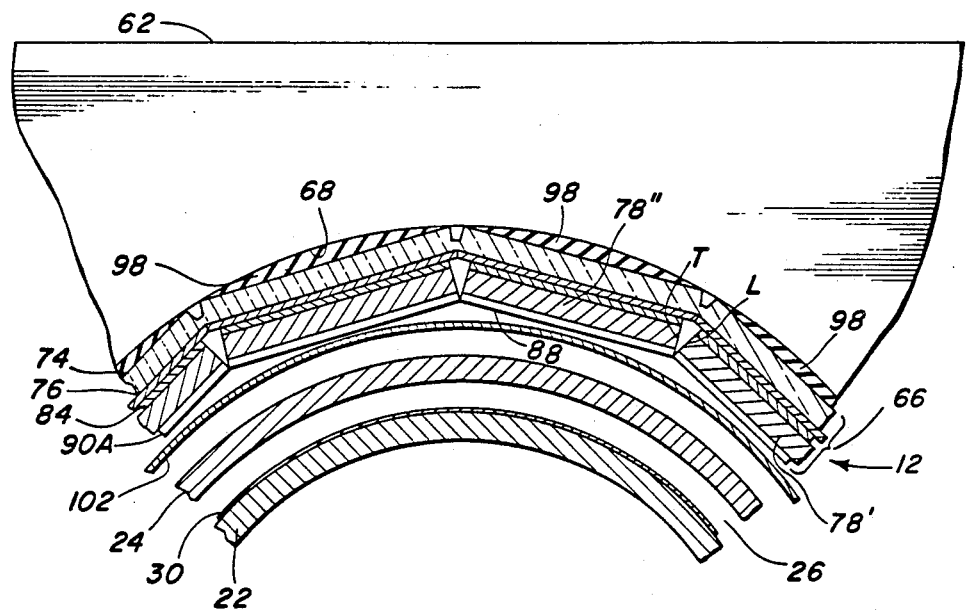
FIG. 2A is an enlargement of the circled portion of FIG. 2.

In accordance with the present invention the film support arrangement includes a pair of curved plates 22 and 24 arranged in a coaxial orientation to each other. The plate 24 is broken away in FIGS. 1, 4 and 7 to show the plate 22 therebehind. The inner plate 22 is formed of clear glass that has an antireflection coating on both sides. The outer plate 24 is formed of an optically diffuse material such as opal glass. The plates 22 and 24 are spaced from each other by a predetermined clearance distance to form a curved film transport passage 26 (FIG. 2A). The passage 26 is in communication with the chute 18. The end of the passage 26 opposite the chute 18 is intermittently closable by a film stop member 28. When asserted the stop 28 provides an abutment against which a radiographic film 30 to be scanned in a manner to be discussed is maintained in a predetermined position. The plates 22, 24 thus cooperate to define therebetween a curved field for receiving the radiograph 30 to be scanned. The field may be envisioned as a portion of a cylindrical surface lying in the gap between the plates 22, 24 and just above the lower plate 22. The field is indicated in the drawing FIGS. 2 and 6 by the reference character F. The outlet of the passage may communicate with a suitable receptacle (not shown).

Mounted to a gantry 32 is a laser source 34 operative to project a beam 36 of radiation through beam forming optics 42 toward a pair of reflecting elements 38 40. A suitable reference photodetector may be provided at an appropriate location for compensating any power variations in the laser source. Such a compensating reference device is omitted from the figure for clarity. A typical compensating reference device is shown in U.S. Pat. No. 3,741,664, which is incorporated by reference herein. The beam is deflected by the operation of the elements 38, 40 also mounted on the gantry 32. The beam passes to a rotatable multifaceted mirror 44. The mirror 44 is mounted for rotation movement in a housing 46 also supported on the gantry 32. As the incoming beam 36 impinges on a facet of the mirror 44 presented thereto a beam 48 of interrogating radiation is directed toward the film 30 supported by the support arrangement 20 in the field F defined between the plates 22, 24.

The elements 34, 38, 40, 42 and 44 comprise means for producing a focussed beam 48 of interrogating radiation on the radiographic film 30. It should be readily appreciated that these means may be implemented by alternative scanning devices to cause the scanning beam 48 to remain at a focus as the beam 48 sweeps across the radiograph 30. Such alternatives may include acousto-optic, holographic and/or other electro-optic devices to cause the beam to scan at a known angular rate.

The gantry 32 is displaceable by a synchronous motor drive (shown schematically at 55) on a pair of guide rails (not shown) in the direction of the double-headed arrow 58. The motor 55 and guide rails may be conveniently mounted anywhere on the scanner 10, as beneath the gantry 32 on the base 14. The film guide 16 is supported on rods 56 which are themselves supported on pillars 60. The pillars 60 are fixed to the base 14. As a result the interrogating beam 48 moves relatively to the film 30 disposed between the plates 22, 24 such that the film 30 may be scanned in a raster fashion by the beam 48.

The photodetector assembly 12 is supported by an arm 62 that is supported from the gantry 32 by a post 64. The photodetector assembly 12 includes a photodetector device 66. The arm 62 is cantilevered over the outer plate 24. As is best seen in FIG. 2A the arm 62 is provided with a substantially curved inner surface 68. The photodetector device 66 is received and fixedly supported on the curved surface 68 of the arm 62 so as to lie radially proximal to the optically diffuse plate 24. As may be appreciated the plate 24 diffuses the radiation transmitted through the radiograph to the photodetector device 66. The photodetector device 66 is formed as a laminate structure. The lower layer of the photodetector device 66 is a substrate 74, such as a circuit board or other rigid member. The substrate 74 is notched at predetermined intervals to permit it to closely approximate the curve of the inner surface 68 of the arm 62.

A first conductor path 76 is disposed on the substrate 74. Mounted above the first conductor path 76 is an array of photoresponsive semiconductor elements 78A through 78N. Adjacent ones of the elements 78 are abutted in next adjacency with the leading edge L (FIG. 2A) of a given element (e.g., the element 78') in physical contact with the trailing edge T of the next adjacent element (e.g., the element 78").

Figure 3:
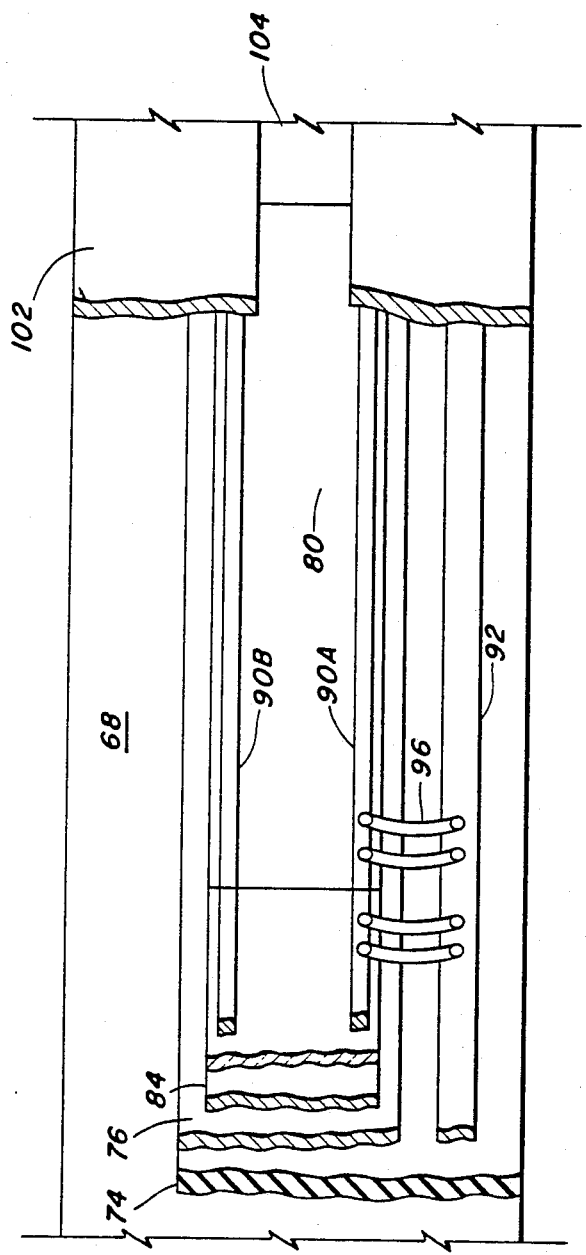
FIG. 3 is an elevational view taken along view lines 3—3 in FIG. 2.

Each element 78 is formed of a body 80 of PIN semiconductor material. The lower surface of the body 80 is covered with a metallization 84 that is disposed in electrical contact with the conductor path 76. The opposite surface 88 of the semiconductor body has a pair of metallization paths 90A, 90B arranged along the confronting elongated edges thereof. As best seen in FIG. 3 a second conductor path 92 is disposed on the substrate 74 in substantially parallel relation to the first conductor path 76. Attachment leads 96 electrically connect the metallization path 90A to the second conductor path 92.

The above-described photodetector device 66 is attached to the curved surface 68 of the arm 62 by any suitable means of attachment, as by epoxy 98.

A mask 102 is disposed between the radial outer surface of the outer plate 24 and the inner surface of the semiconductor elements 78 of the photodetector device 66. The mask 102 is mounted to the arm 62 of the photodetector assembly 12. The mask 102 is fabricated from an opaque material and has a slit aperture 104 therein. The mask 102 serves to compensate for slight changes of the solid radiation collection angle subtended by the detector elements 78. The mask 102 provides a linear aperture to define a predetermined, nonvarying angle through which the photodetector device 66 receives the radiation which has passed through the radiograph 30.

The photodetector device 66 may be fabricated in any convenient manner. For example, individual ones of the elements 78 are selected on the basis of compatibility as regards sensitivity, dark current and capacitance. Elements having substantially uniform sensitivity uniformly low dark current and uniformly low capacitance are preferred.

An elongated, narrow printed circuit board having the first and second conductor paths 76 and 92, respectively, is fabricated and transversely notched to facilitate bending. The board is bent and mounted, as by the epoxy 98, to the inner surface 68 of the arm 62. The photodetector elements 78 are attached to the first conductor path 76 using an electrically conductive cement to achieve electrical contact with the metallization 84. The leads 96 are bonded to the second conductor path 92 and the metallization path 90A on each element 78. The elements are as noted, attached in an edge-to-edge relationship.

The electrical conductor paths 76 and 92 are connected to a preamplifier circuit 110 (shown schematically in FIG. 2). The circuit 110 is conveniently mounted in close physical proximity to the arm 62. The amplifier circuit 110 is configured from an operational amplifier such as that sold by Precision Monolithics, Inc. under Model Number OP-37. The values of the feedback resistor and capacitor are selected to provide optimum frequency response in keeping with the velocity of the interrogating beam 48. The output of the amplifier 110 and the output from the compensating reference photodetector, previously discussed, are combined to form a corrected signal that is applied to an analog to digital converter for further processing consistent with established practice of the art.

Figure 4:
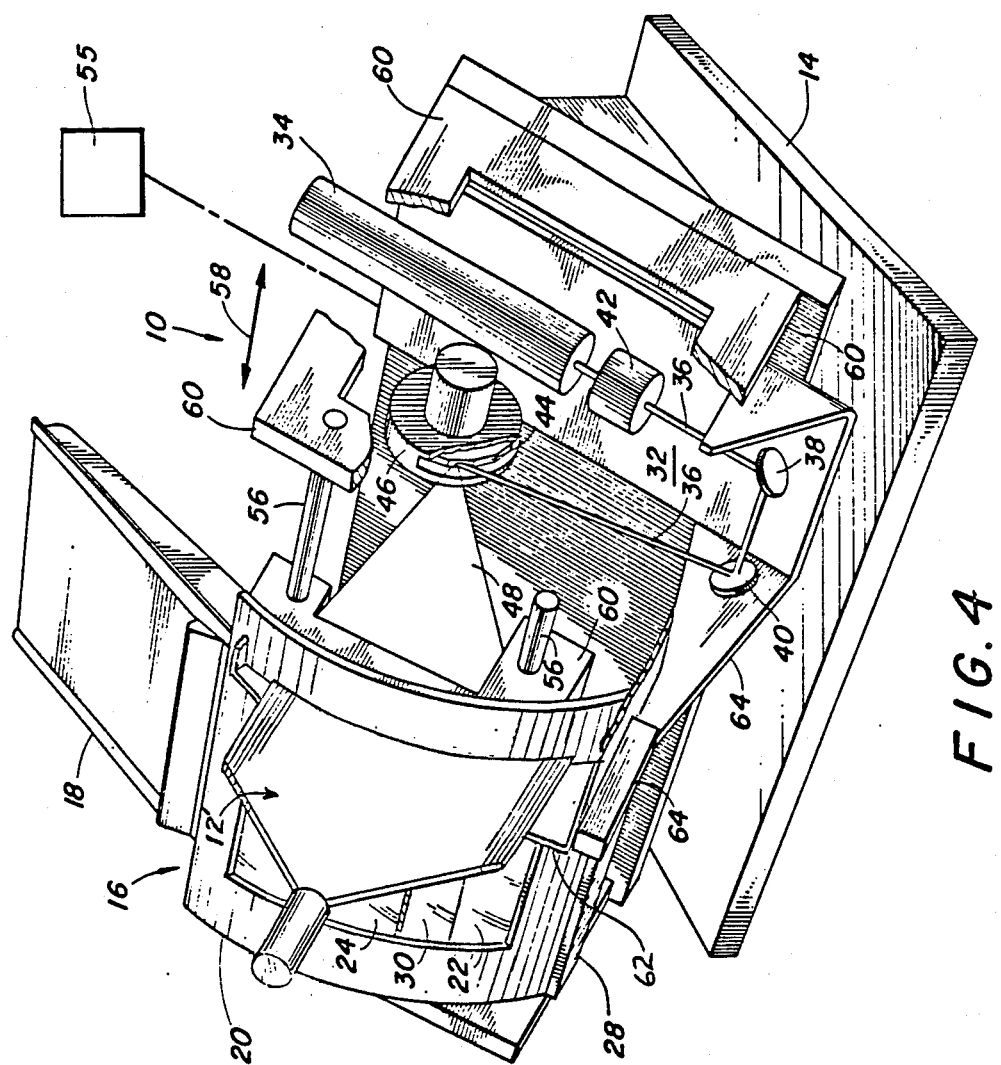
FIG. 4 is a highly stylized pictorial representation similar to that shown in FIG. 1 of a laser scanning apparatus having a photodetector assembly in accordance with a second embodiment of the present invention.
Figure 5:
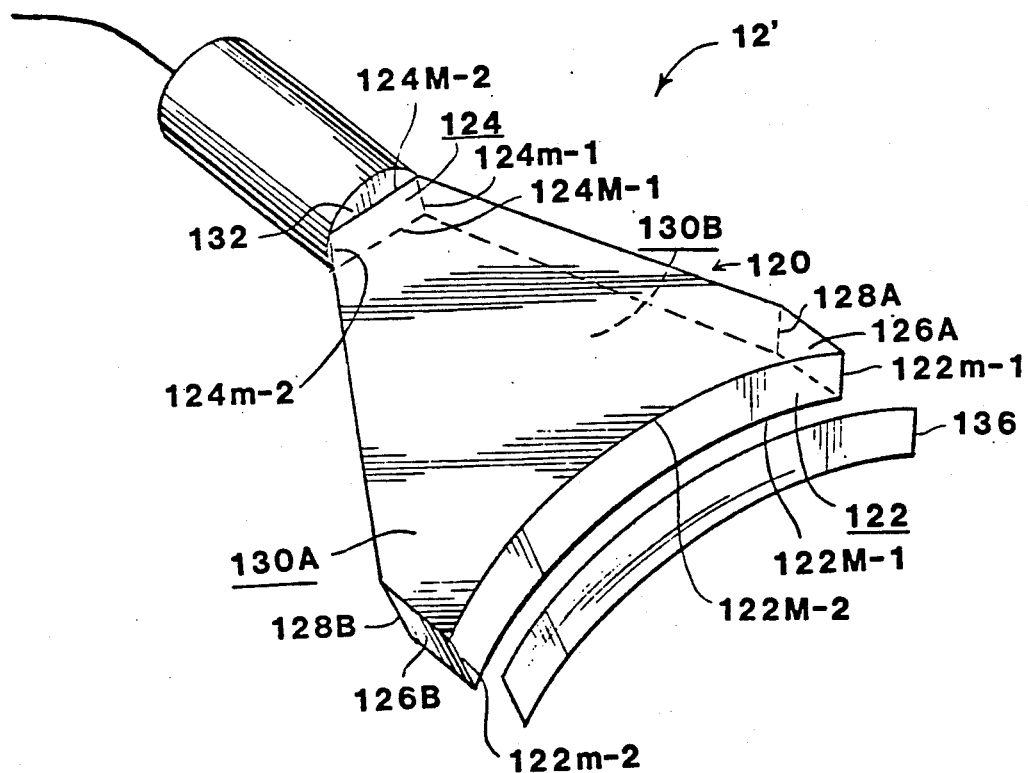
FIG. 5 is a perspective view of the photodetector assembly shown in FIG. 4.
Figure 6:
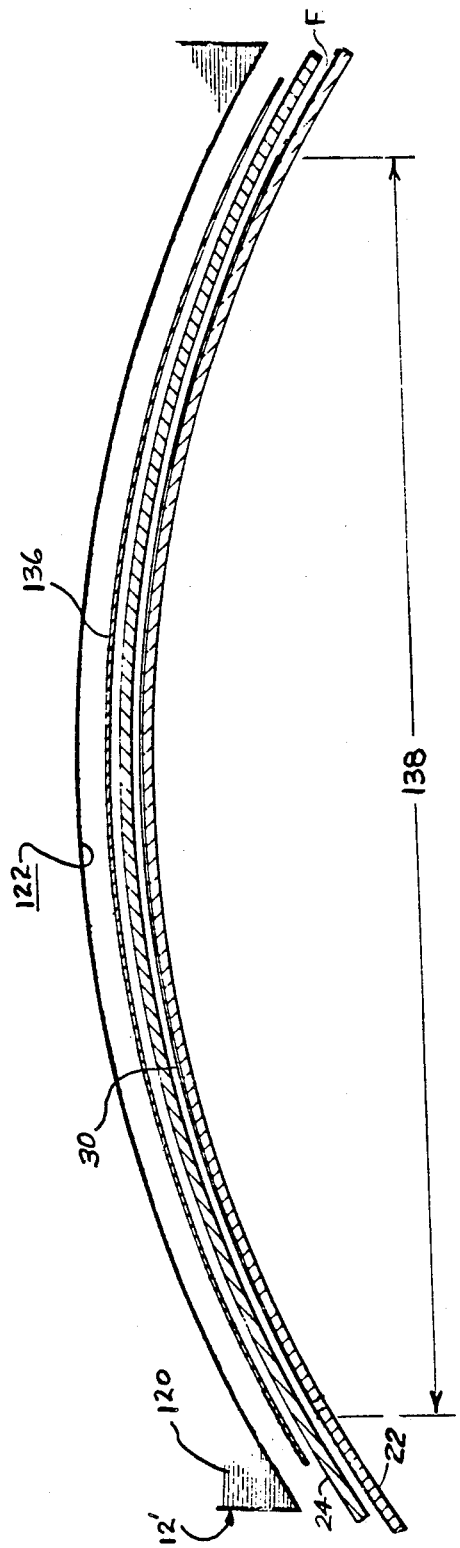
FIG. 6 is a side elevation view illustrating the spatial relationship of the photodetector assembly shown in FIG. 4 and the field of the laser scanning apparatus.

With reference to FIGS. 4, 5 and 6 respectively shown is a pictorial representation similar to FIG. 1, a perspective view and a side elevation view of a photodetector assembly 12' in accordance with a second embodiment of the present invention. The photodetector assembly 12' is supported over the outer plate 24 by the support arm 62 in a manner generally similar to that discussed above. As is seen in FIGS. 5 and 6 the photodetector assembly 12' includes a transparent block 120 having a curvilinearly shaped front input end surface 122 and a planar back output end surface 124. The block 120 may be fabricated by any convenient method, such as machining, and from any suitable transparent material, such as polymethylmethacrylate, polycarbonate or glass. In the preferred case the block is fabricated from an L cast acrylic sheet material manufactured by E. I. du Pont de Nemours and Company, Inc. and sold under the trademark LUCITE. The block may be made hollow if desired.

The front surface 122 and the back surface 124 are finished to define a clear, optical quality surface free of scratches or other visible defects which would impair the optical transmission properties of these surfaces. An antireflection coating, preferably a non-water soluble broadband multilayer dielectric such as that sold by Evaporated Coatings Inc., Huntingdon Valley, Pa. as "coating number 129", may be present on the surfaces 122, 124, if desired.

The front surface 122 has opposed pairs of major and minor edges respectively indicated in FIG. 5 by reference characters 122M-1 and 122M-2 and 122m-1 and 122m-2. Similarly the planar back surface 124 has opposed pairs of major and minor edges respectively indicated in the drawings by reference characters 124M-1 and 124M-2 and 124m-1 and 124m-2. Edge surfaces 126A and 126B extend between corresponding minor edges 122m-1, 124m-1 and 122m-2, 124m-2 of the front surface 122 and the back surface 124, respectively. In the preferred instance the edge surfaces 126A, 126B have a bend 128A, 128B, respectively, formed therein which define relatively short parallel portions between the bend 128 and the adjacent minor edge of the front surface 122 and relatively elongated portions between the bend 128 and the adjacent minor edge of the back surface 124. The elongated portions generally taper from the front surface 122 toward the back surface 124. It should be understood that the edge surfaces 126 may be provided in which the bend 128 is eliminated or which taper in other than a straight line fashion from the front to the back surfaces and remain within the contemplation of the present invention. Moreover, although a block 120 has been illustrated in which the width dimension of the front surface 122 is greater than the width dimension of the back surface 124 it should be understood that such a relationship is not necessarily required.

A pair of side surfaces 130A and 130B respectively extends between corresponding major edges 122M-1, 124M-1 and 122M-2, 124M-2 of the front surface 122 and the back surface 124. The side surfaces 130A, 130B are bounded by the edge surfaces 126A, 126B. Either the side surfaces 130A, 130B and/or the edge surfaces 126A, 126B may be provided with a reflective scattering coating thereon. A barium sulfate coating such as that sold by Eastman Kodak Inc. as "White Reflective Coating" catalog number 118-1759 is preferred.

A photodetector device 132 lies in light transmissive engagement with the back surface 124. Any suitable photodetector device may be used, such as a PIN diode or a photomultiplier tube. The photodetector device 132 has a predetermined active area associated therewith. In the preferred instance the area of the planar back surface 124 is sized to efficiently couple light to the active area of the photodetector device 132.

As is best seen in FIGS. 4 and 6 the photodetector assembly 12' is supported on the arm 62 so as to position the curvilinear front surface 122 with respect to the curved field F (defined between the plates 22 and 24) such that all points on the front surface 122 are equidistant from the field F. A neutral density optical filter 136 (FIGS. 5 and 6) is disposed intermediate the plate 24 and the front surface 122 and thus lies between the field F and the front surface 122. The filter 136 has a density gradient associated therewith. The density of the filter 136 is greater at its midportion than at its ends so that the response of the photodetector assembly 12' is uniform across the width 138 of the field F.

In operation, with a film 30 received within the field F a beam of interrogating radiation is directed toward the film. The beam sweeps across the film 30 and light passing through the film enters the block 120 of the assembly 12' through the front input end surface 122. The light may pass either directly or as a result of one or more reflections from the side surfaces 130A, 130B and/or the edge surfaces 126A, 126B to the back output end surface 124. The light is transmitted through the back surface 124 into the photodetector device 132. The neutral density filter 136 attenuates the light entering the block 120 in a manner to compensate for variations in coupling between the field F and the photodetector assembly 12' as a function of position across the width 138 of the field F.

Figure 7:
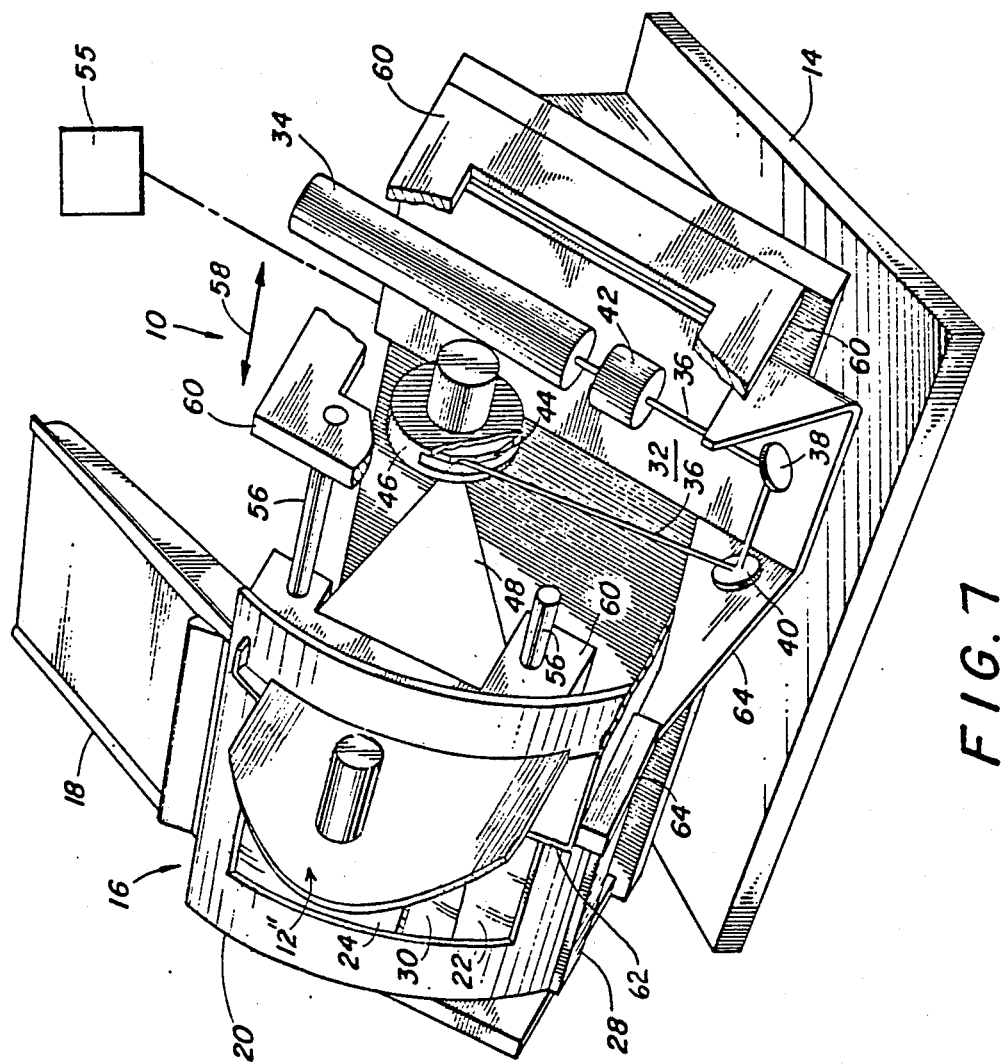
FIG. 7 is a highly stylized pictorial representation similar to those shown in FIGS. 1 and 4 of a laser scanning apparatus having a photodetector assembly in accordance with a third embodiment of the present invention.
Figure 8:
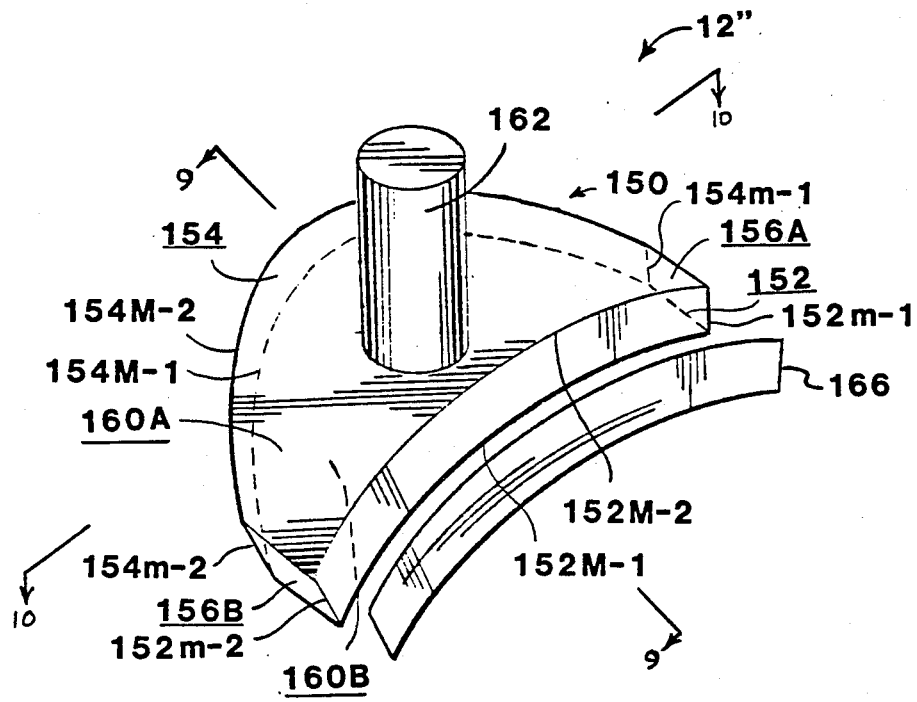
FIG. 8 is a perspective view of the photodetector assembly shown in FIG. 7.

With reference to FIGS. 7 and 8 respectively shown is a pictorial representation similar to FIGS. 1 and 4 and a perspective view similar to FIG. 5 of a photodetector assembly 12" in accordance with a third embodiment of the present invention. The photodetector assembly 12" is again supported over the outer plate 24 by the support arm 62 in the manner previously discussed. As is seen in FIG. 8 the photodetector assembly 12" includes a transparent block 150 having a curvilinearly shaped front input end surface 152 and a back reflecting surface 154 shaped in a manner to be described. The block 150 is fabricated in a manner and from materials similar to those discussed in connection with the block 120. The block 150 may also be hollow, if desired.

The front surface 152 and the back surface 154 are finished to define an optical quality thereto. An antireflection coating similar to that noted above, may be present on the front surface 152. The back surface 154 is coated with a suitable material, such as a vacuum deposited layer of aluminum, to provide a highly reflective mirror finish thereon.

The front surface 152 has opposed pairs of major and minor edges respectively indicated in FIG. 8 by reference characters 152M-1 and 152M-2 and 152m-1 and 152m-2. Similarly, the back surface 154 has, in the preferred case, opposed pairs of major and minor edges respectively indicated by reference characters 154M-1 and 154M-2 and 154m-1 and 154m-2. As will be discussed the block 150 is formed with edge surfaces 156A and 156B which extend between corresponding minor edges of the front surface 152 and the back surface 154, respectively. Side surfaces 160A, 160B extend between the front and back surfaces, all in a manner generally similar to the arrangement as discussed in connection with FIG. 5.

Figure 9:
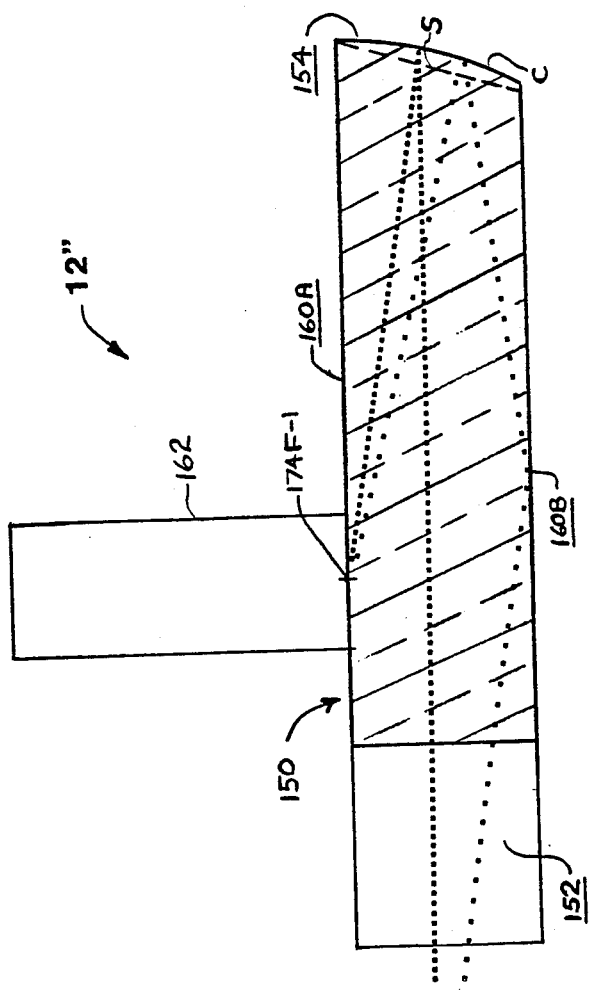
FIG. 9 is an elevational view in section of the photodetector assembly of FIG. 8 taken along section lines 9—9 therein.

A photodetector device 162, similar to the device 132, is mounted in a location to be described so as to be in light transmissive engagement with one of the side surfaces 160, e.g., the surface 160A. As seen in FIG. 9 the back surface 154 exhibits a predetermined shape such that, when intersected by a plane extending perpendicularly to the side surface 160A on which the photodetector device 162 is mounted, either a straight line segment S or, preferably, a curved line segment C is defined. Both the segments S and C are indicated on the drawing of FIG. 9. More preferably the curved line segment C is a conic section, and most preferably the conic section is an ellipse. As used herein the term "conic section" means the curve of intersection produced by passing a plane through a right cone, and is either a circle, ellipse, parabola or hyperbola. The definition and discussion of conic sections as set forth in F. Zozzora. "Engineering Drawing", Second Edition, McGraw Hill, 1958 is hereby incorporated by reference. However, any appropriately shaped curve may be used and remain within the contemplation of the present invention. It should also be understood that the curve may be approximated by a number of generally linear and/or curved segments.

Figure 10:
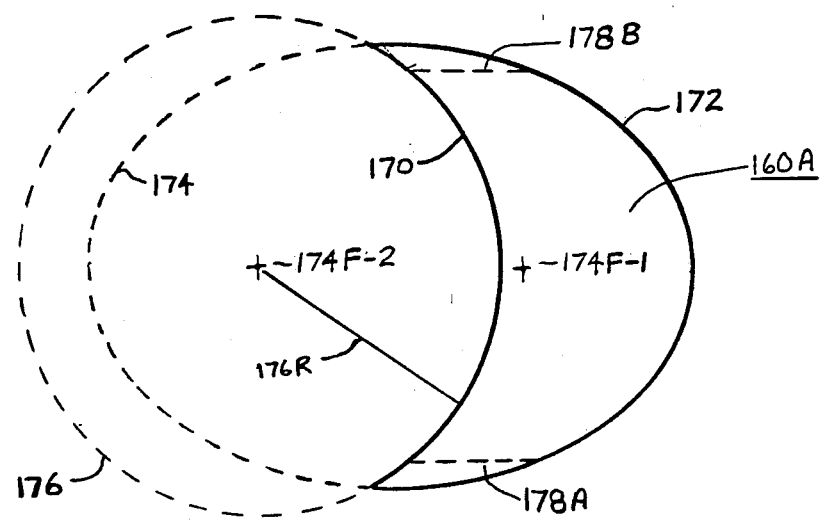
FIG. 10 is a plan view of one side surface of the photodetector in accordance with the third embodiment of the invention taken along view lines 10—10 of FIG. 8.

The perimeters of side surfaces 160A and 160B are similar in shape. FIG. 10 illustrates a view of one of the side surfaces 160A taken in a direction parallel to an axis extending perpendicularly thereto. The side surface 160A has a perimeter that includes a first portion 170 defined by an arc of a circle and a second portion 172 defined by a curved line. These arcs 170, 172 are indicated in solid lines in FIG. 10. Again, the curved line 172 is preferably an arc of a conic section and most preferably an arc of an ellipse. The arc 172 is part of an ellipse 174 having a pair of foci 174F-1 and 174F-2. The arc 172 included in the perimeter of the side surface 160A of the block surrounds the focus 174F-1. The photodetector device 162 is mounted to the side surface 160A substantially at the focus 174F-1. It should be understood the arc 172 may be piece-wise comprised of a number of linear and/or curved segments and remain within the contemplation of the present invention. The arc 170 is part of a circle 176 centered at the other focus 174F-2, with the radius 176R of the circle 176 being less than the distance between the foci 174F-1 and 174F-2.

Stated in an alternative manner the block 150 may be defined as that volume or segment of an ellipsoid containing one of the foci 174F-1 thereof that is produced by the intersection of the ellipsoid with two parallel planes and a right circular cylinder. The projection of the right circular cylinder appears as the circle 176 in FIG. 10. The two parallel planes coincide with the surfaces 160A and 160B. One of the planes contains both of the foci 174F-1 and 174F-2 (the plane coinciding with the surface 160A). The axis of the right circular cylinder is perpendicular to both planes and passes through the other of the foci 174F-2. The radius 176R of the cylinder is less than the distance between the foci 174F-1 and 174F-2. Thus, the front surface 152 of the block 150 coincides with the cylinder the back surface 154 is defined by the ellipsoid itself, and the side surfaces are defined by the intersecting planes. If desired the lateral extremities of the block thus defined may be cut by two additional parallel planes, both extending perpendicularly to the side surfaces 160A and 160B, along the dotted lines 178A, 178B to define the edge surfaces 156A, 156B (FIG. 8).

In a manner similar to that shown in FIG. 6 the photodetector assembly 12'' is supported on the arm 62 so as to position the curvilinear front input end surface 152 with respect to the curved field F (defined between the plates 22 and 24) such that all points on the front surface 152 are equidistant from the field F. A neutral density optical filter 166 having a density gradient similar to that discussed in connection with the filter 136 and for the same purpose as there discussed may be disposed intermediate the plate 24 and the front surface 152 and thus lies between the field F and that front surface 152.

In operation with a film 30 received within the field F a beam of interrogating radiation is directed toward the film. The beam sweeps across the film 30 and light passing through the film enters the photodetector assembly 150 through the front input end surface 152. The light entering the assembly 150 is directed by the back surface 154 to the photodetector device 162. Light directed toward the photodetector device 162 may have been reflected from one or more of the side surfaces 160A, 160B and/or edge surfaces 156A, 156B (if provided). Representative ray paths are shown in dotted lines in FIG. 9.

Figure 11:
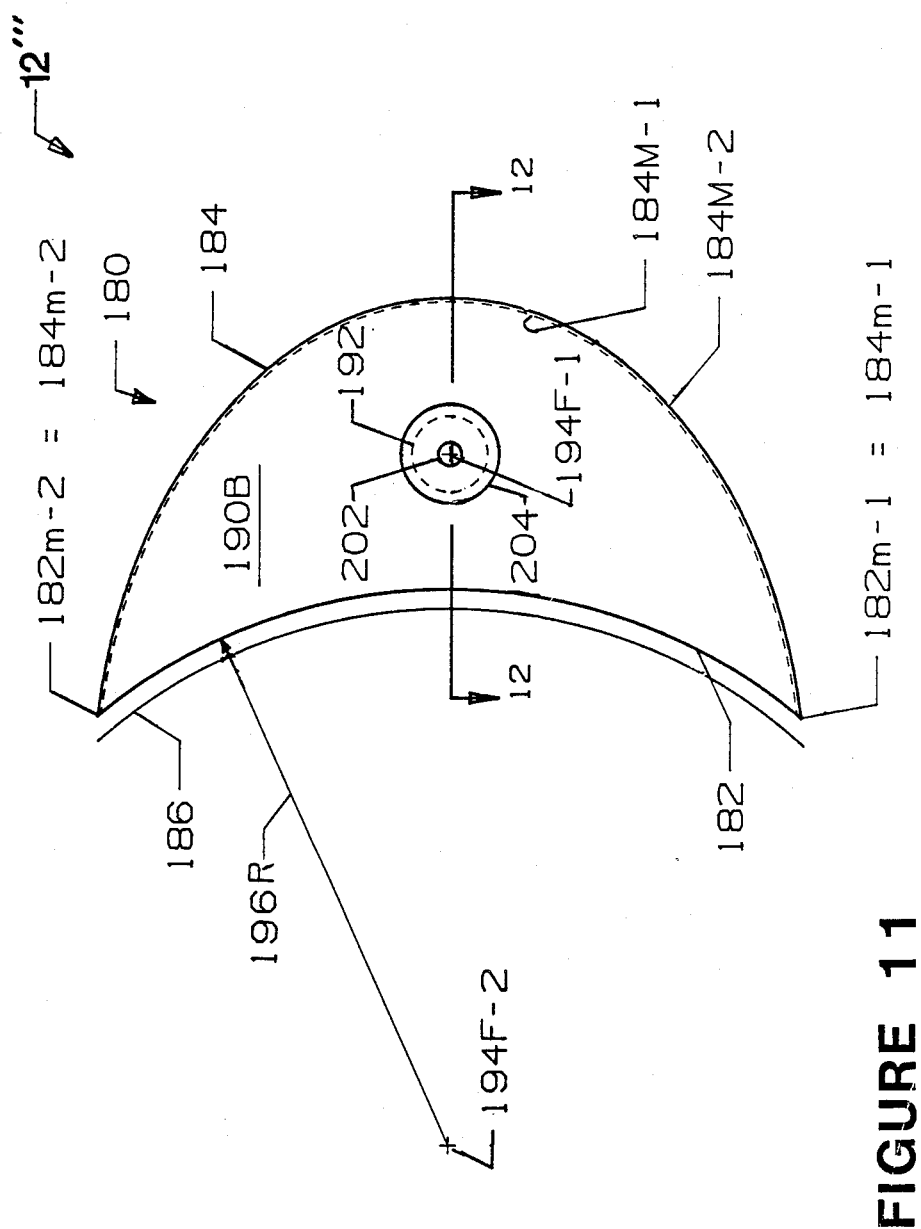
FIG. 11 is a plan view of a photodetector assembly in accordance with a fourth embodiment of the present invention.
Figure 12:
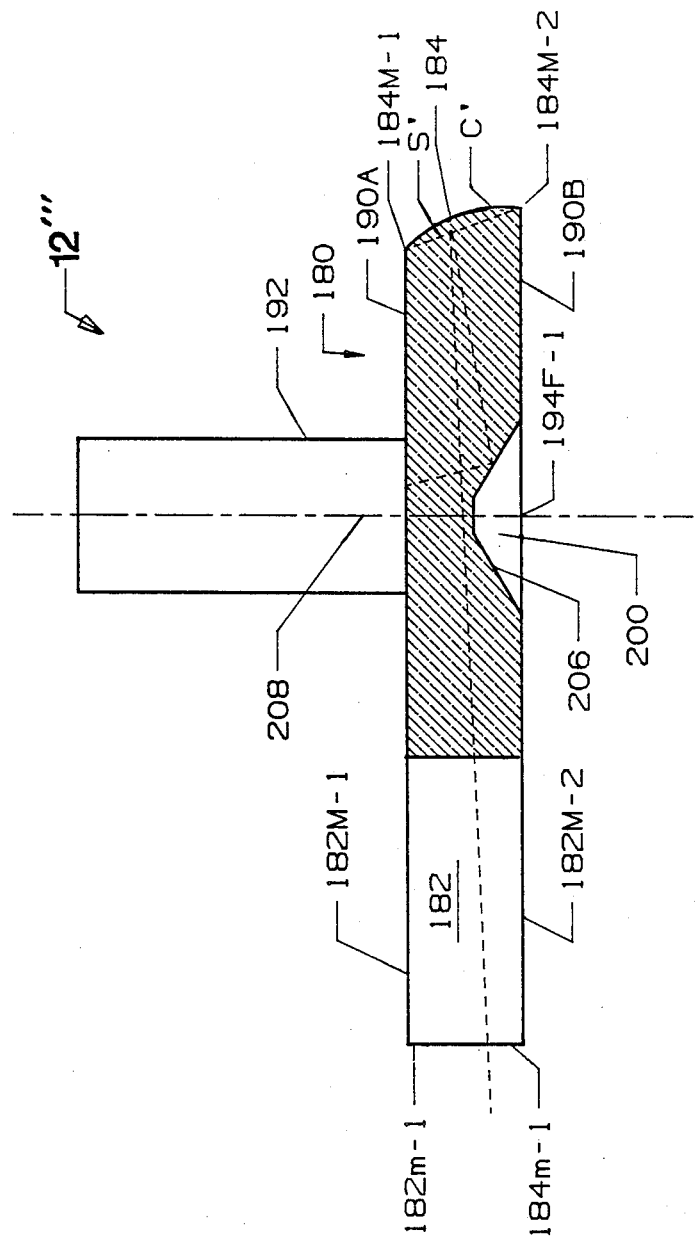
FIG. 12 is an elevational view in section of the photodetector assembly of FIG. 11 taken along section lines 12—12 therein and looking in the direction of the arrows.

With reference to FIGS. 11 and 12, respectively, there is shown a plan view of a photodetector assembly and an elevational view in section similar to FIG. 9 of a photodetector assembly 12''' in accordance with a fourth embodiment of the present invention. The photodetector assembly 12''' is again supported over the outer plate 24 by the support arm 62 in the manner previously described.

As seen in FIGS. 11 and 12, the photodetector assembly 12''' includes a transparent block 180 having a curvilinearly shaped front input end surface 182 and a back reflecting surface 184. The block 180 is fabricated in a manner and from materials similar to those described in connection with blocks 120 and 150. The block 180 may also be hollow, if desired.

As with the photodetector assembly 12'', the front surface 182 and the back surface 184 are finished to define an optical quality thereto. An antireflection coating, similar to that already described on other embodiments may be present on the front surface 182. The back surface 184 is coated with a suitable material, such as a vacuum deposited layer of aluminum to provide a highly reflective mirror finish thereon.

The front surface 182 has opposed pairs of major and minor edges respectively indicated in FIGS. 11 and 12 by the reference characters 182M-1, 182M-2, 182m-1 and 182m-2. Similarly, the back surface 184 has opposed pairs of major and minor edges respectively indicated by reference characters 184M-1, 184M-2, 184m-1 and 184m-2. In the embodiment illustrated, the front surface minor edge 182m-1 is the same as the back surface minor edge 184m-1. Similarly, the front surface minor edge 182m-2 is the same as the back surface minor edge 184m-2. In other words, back surface 184 does not have bends in it establishing edge surfaces similar to edge surfaces 156A and 156B of block 150. It should be understood that edge surfaces similar to edge surfaces 156A and 156B may be provided on block 180. First and second side surfaces 190A and 190B, respectively extend between the front and back surfaces, all in a manner generally similar to the arrangements as discussed in connection with FIGS. 5 and 8.

A photodetector device 192, similar to devices 132 and 162, is mounted in a location to be described so as to be in light transmissive engagement with one of the side surfaces 190, e.g., the surface 190A. As seen in FIG. 12, the back surface 184 exhibits a predetermined shape such that, when intersected by a plane extending perpendicularly to the first side surface 190 A on which the photodetector device 192 is mounted (or the second side surface 190B), either a straight line segment S' or preferably, a curved line segment C' is defined. Both the segments S' and C' are indicated on FIG. 12. More preferably, the curved line segment C' is a conic section, and most preferably the conic section is an ellipse. The term "conic section" is defined here as it was defined in reference to FIG. 9. Again, any appropriately shaped curve may be used and remain within the contemplation of the present invention. Further, the curve may be approximated by a number of generally linear and/or curved segments.

The perimeters of side surfaces 190A and 190B are similar in shape and similar to side surfaces 160A and 160B as previously described by referring to FIG. 10. To elaborate, the second side surface 190B has a perimeter that includes a first portion, previously described as the front surface major edge 182M-2, defined by an arc of a circle and a second portion, previously described as the back surface major edge 184M-2, defined by a curved line. The curved line or edge 184M-2 is preferably an arc of a conic section and most preferably an arc of an ellipse. As illustrated in FIG. 11, the arc or edge 184M-2 is part of an ellipse having a pair of foci 194F-1 and 194F-2. The arc or edge 184M-2 included in the perimeter of the side surface 190B of the block 180 surrounds the focus 194F-1. It should be understood the arc or edge 184M-2 may be piece-wise comprised of a number of linear and/or curved segments and remain within the contemplation of the present invention. The arc or edge 182M-2 is part of a circle centered at the other focus 194F-2, with the radius 196R of the circle being less than the distance between the foci 194F-1 and 194F-2.

Side surface 190B has an indentation 200 positioned substantially at the focus 194F-1. The preferred shape of the indentation is that of a truncated cone defined by a circular area 202, a circular perimeter 204 and a conical surface or skirt 206 intermediately connecting the circular area 202 and the perimeter 204. The circular perimeter 204 is larger than the circumference of the circular area 202. Further, the circular perimeter 204 is centered on the focus 194F-1 and in the plane of side surface 190B. The conical surface 206 extends into the body 180 preferably less than half the distance between side surfaces 190B and 190A, and more preferably about 40% of the distance between side surfaces 190B and 190A. The conical surface 206 angles from an axis 208 of the truncated cone 200 in the range of 50 through 70 degrees, and preferably at about 60 degrees. This indentation can be made by any convenient method, such as machining.

The conical surface 206 is finished to define a clear optical quality surface free of scratches or other visible defects which would impair its optical properties. The conical surface 206 is coated with a suitable material, such as a vacuum deposited layer of aluminum, to provide a highly reflective mirror finish thereon.

Like block 150, block 180 can be defined as that volume or segment of an ellipsoid that is produced by the intersection of the ellipsoid with two parallel planes and a right circular cylinder. The two parallel planes coincide with the surfaces 190A and 190B. One of the planes, i.e., the plane coinciding with the second surface 190B, contains both of the foci 194F-1 and 194F-2 of the ellipsoid. The reflective indentation on the second side surface 190B is positioned at the foci 194F-1. The axis of the right circular cylinder is perpendicular to both planes and passes through the other of the foci 194F-2. The radius 196R of the cylinder is less than the distance between the foci 194F-1 and 194F-2. Thus, the front surface 182 of the block 180 coincides with the cylinder, the back surface 184 is defined by the ellipsoid itself, and the side surfaces 190A, 190B are defined by the intersecting planes.

The photodetector device 192 is mounted to the side surface 190A substantially centered on the axis 208 passing through the focus 194F-1 and the center of the first circular area 202. The axis 208 is perpendicular to the side surfaces 190A, 190B.

In a manner similar to that shown in FIG. 6, the photodetector assembly 12''' is supported on the arm 62 so as to position the curvilinear front input end surface 182 with respect to the curved field F such that all points on the front surface 182 are equidistant from the field F. A neutral density optical filter 186 (see FIG. 11) having a density gradient similar to that discussed in connection with filters 136, 166 and for the same purpose as previously described may be disposed intermediate the plate 24 and the front surface 182 and, thus, lies between the field F and the front surface 182.

In operation with a film 30 received within the field F, a beam of interrogating radiation is directed toward the film substantially from the foci 194F-2 of the ellipsoid. The beam sweeps across the film 30 and light passing through the film enters the photodetector assembly 12''' through the front input end surface 182. The light entering the block 180 is directed by the back surface 184 to the conical surface 206 which directs the light from the back surface 184 to the photodetector device 192. A representative ray path is shown in dotted lines in FIG. 11. Of course, light directed toward the photodetector device 192 may have been reflected from one or more of the side surfaces 190A, 190B and/or the conical surface 206 with or without reflecting from the back surface 184. Thus, the indentation 200 functions as means for directing light to the photodetector device 192.

It is to be understood that the indentation 200 can be any other appropriate shape, such as a non-truncated cone. Further, the axis 208 need not be perpendicular to the side surfaces 190A, 190B, resulting in an inclined truncated or non-truncated cone. The circular area 202 and/or side surfaces 190A and 190B (but for where the photodetector device 192 is mounted on side surface 190A) can also be coated to provide a highly reflective mirror finish thereon. Further, side surface 190A need not be parallel to side surface 190B. All of these modifications are to be understood as being encompassed within the scope of the invention.

A laser scanning apparatus in accordance with any of the above-described embodiments of the present invention provides constant pathlength to the radiograph, constant velocity of the spot of interrogating radiation across the radiograph, constant incidence angle of the beam onto the radiograph and, as a consequence of the latter, constant pathlength through the radiograph. The combination of the rotating mirror, along with the short response time of the photodetector, provides a scanning apparatus with increased scanning speed. As a result a laser scanning apparatus is provided which overcomes all of the perceived disadvantages of the prior art system.

Those skilled in the art, having benefit of the teachings of the present invention as hereinabove set forth may effect numerous modifications thereto. These modifications are to be construed as being encompassed within the scope of the present invention as set forth in the appended claims.

What is claimed is:

1. In a laser scanning apparatus of the type having
   a curved field for receiving a radiograph to be scanned,
   a source of interrogating radiation,
   means for producing a focussed scanning beam of interrogating radiation onto the radiograph,
   a gantry for mounting the source and beam producing means,
   means for relatively displacing the gantry with respect to the field so as to cause the beam to scan the field in raster fashion,
   a photodetector assembly positioned with respect to the field to receive radiation transmitted through the radiograph, the photodetector assembly itself including a photodetector device comprised of a plurality of semiconductor elements connected electrically in parallel and physically arranged in edge-to-edge abutting relationship,
   wherein the improvement comprises the elements being arranged in a curvilinear pattern with each being substantially equally spaced from the radiograph.

2. The laser scanning apparatus of claim 1 wherein the curved field comprises a first and a second plate coaxially arranged with respect to each other.

3. The laser apparatus of claim 2 wherein the plate proximal to the photodetector assembly is formed of an optically diffuse material.

4. The laser scanning apparatus of claim 1 further comprising a slit mask disposed intermediate the curved field and the photodetector assembly.

5. The laser scanning apparatus of claim 2 further comprising a slit mask disposed intermediate the curved field and the photodetector assembly.

6. The laser scanning apparatus of claim 3 further comprising a slit mask disposed intermediate the curved field and the photodetector assembly.

7. The laser scanning apparatus of claim 1 wherein the beam producing means comprises a rotatable multi-faceted mirror and beam forming optics.

8. The laser scanning apparatus of claim 2 wherein the beam producing means comprises a rotatable multi-faceted mirror and beam forming optics.

9. The laser scanning apparatus of claim 3 wherein the beam producing means comprises a rotatable multi-faceted mirror and beam forming optics.

10. The laser scanning apparatus of claim 4 wherein the beam producing means comprises a rotatable multi-faceted mirror and beam forming optics.

11. In a laser scanning apparatus of the type having
    a curved field for receiving a radiograph to be scanned,
    a source of interrogating radiation,
    means for producing a focussed scanning beam of interrogating radiation onto the radiograph,
    a gantry for mounting the source and beam producing means, and
    means for relatively displacing the gantry with respect to the field so as to cause the beam to scan the field in raster fashion,
    a photodetector assembly positioned with respect to the field to receive radiation transmitted through the radiograph,
    wherein the improvement comprises the photodetector assembly itself comprising: a transparent block having a front input end surface and a back output end surface, both the front surface and the back surface having opposed pairs of major and minor edges, the front input end surface being curvilinear in shape with all points on the curvilinear end surface being equally spaced from the field;
    a pair of edge surfaces extending between corresponding minor edges of the front and back surfaces;
    a pair of side surfaces extending between corresponding major edges of the front and back surfaces; and
    a photodetector device mounted in light transmissive engagement with the back output end surface.

12. The scanning apparatus of claim 11 wherein the photodetector device has an active area associated therewith and wherein the output end surface has an area that is sized to efficiently couple light to the active area of the photodetector device.

13. The scanning apparatus of claim 12 wherein the field has a width dimension associated therewith, further comprising:
    a neutral density optical filter disposed intermediate the curved field and the photodetector assembly the filter having a density gradient adapted to make the response of the photodetector assembly uniform across the width dimension of the field.

14. The scanning apparatus of claim 11 wherein the field has a width dimension associated therewith, further comprising:
    a neutral density optical filter disposed intermediate the curved field and the photodetector assembly, the filter having a density gradient adapted to make the response of the photodetector assembly uniform across the width dimension of the field.

15. The scanning apparatus of claim 14 wherein the curved field comprises a first and a second plate coaxially arranged with respect to each other.

16. The scanning apparatus of claim 13 wherein the curved field comprises a first and a second plate coaxially arranged with respect to each other.

17. The scanning apparatus of claim 12 wherein the curved field comprises a first and a second plate coaxially arranged with respect to each other.

18. The scanning apparatus of claim 11 wherein the curved field comprises a first and a second plate coaxially arranged with respect to each other.

19. The scanning apparatus of claim 14 wherein the side surfaces each have a reflective scattering coating thereon.

20. The scanning apparatus of claim 13 wherein the side surfaces each have a reflective scattering coating thereon.

21. The scanning apparatus of claim 12 wherein the side surfaces each have a reflective scattering coating thereon.

22. The scanning apparatus of claim 11 wherein the side surfaces each have a reflective scattering coating thereon.

23. The scanning apparatus of claim 14 wherein the edge surfaces each have a reflective scattering coating thereon.

24. The scanning apparatus of claim 13 wherein the edge surfaces each have a reflective scattering coating thereon.

25. The scanning apparatus of claim 12 wherein the edge surfaces each have a reflective scattering coating thereon.

26. The scanning apparatus of claim 11 wherein the edge surfaces each have a reflective scattering coating thereon.

27. In a laser scanning apparatus of the type having
a curved field for receiving a radiograph to be scanned,
a source of interrogating radiation,
means for producing a focussed scanning beam of interrogating radiation onto the radiograph,
a gantry for mounting the source and beam producing means and
means for relatively displacing the gantry with respect to the field so as to cause the beam to scan the field in raster fashion,
a photodetector assembly positioned with respect to the field to receive radiation transmitted through the radiograph,
wherein the improvement comprises the photodetector assembly itself comprising:
a transparent block having a front input end surface, a back reflecting surface, and a first and a second side surface; and
a photodetector device mounted in light transmissive engagement with the one of the side surfaces;
the input end surface being curvilinear in shape with all points on the curvilinear surface being equally spaced from the field, the back reflecting surface being shaped and arranged to reflect light incident thereon to the photodetector device.

28. The scanning apparatus of claim 27 wherein the back surface is shaped such that the intersection of the back surface and a plane extending perpendicular to the side surface on which the photodetector device is mounted defines a straight line.

29. The scanning apparatus of claim 27 wherein the back surface is shaped such that the intersection of the back surface and a plane extending perpendicular to the side surface on which the photodetector device is mounted defines a conic section.

30. The scanning apparatus of claim 29 wherein the side surface, which, when viewed in a direction parallel to an axis erected perpendicular to the side surface on which the photodetector device is mounted, has a perimeter comprised of a circular arc and an arc of a conic section.

31. The scanning apparatus of claim 28 wherein the side surface which when viewed in a direction parallel to an axis erected perpendicular to the side surface on which the photodetector device is mounted, has a perimeter comprised of a circular arc and an arc of a conic section.

32. The scanning apparatus of claim 27 wherein the side surface, which when viewed in a direction parallel to an axis erected perpendicular to the side surface on which the photodetector device is mounted, has a perimeter comprised of a circular arc and an arc of a conic section.

33. The scanning device of claim 32 wherein the conic section is an ellipse, the portion of the arc of the ellipse included in the perimeter of the block surrounds at least one focus thereof, and wherein the photodetector device is mounted to the side surface substantially at the focus of the ellipse included within the block.

34. The scanning device of claim 31 wherein the conic section is an ellipse, the portion of the arc of the ellipse included in the perimeter of the block surrounds at least one focus thereof, and wherein the photodetector device is mounted to the side surface substantially at the focus of the ellipse included within the block.

35. The scanning device of claim 30 wherein the conic section is an ellipse, the portion of the arc of the ellipse included in the perimeter of the block surrounds at least one focus thereof, and wherein the photodetector device is mounted to the side surface substantially at the focus of the ellipse included within the block.

36. The scanning device of claim 27 wherein the transparent block is a segment of an ellipsoid containing one of the foci thereof, the segment of the ellipsoid being produced by the intersection of the ellipsoid with two parallel planes and a right circular cylinder, one of the planes containing both of the foci of the ellipsoid, the planes forming the side surfaces of the block, the axis of the cylinder being perpendicular to both planes and passing through the other of the foci the radius of the cylinder being less than the distance between the foci.

37. The scanning device of claim 36 wherein the photodetector device is mounted to the side surface substantially at the focus of the ellipsoid contained within the block.

38. The scanning apparatus of claim 37 wherein the curved field comprises a first and a second plate coaxially arranged with respect to each other.

39. The scanning apparatus of claim 35 wherein the curved field comprises a first and a second plate coaxially arranged with respect to each other.

40. The scanning apparatus of claim 34 wherein the curved field comprises a first and a second plate coaxially arranged with respect to each other.

41. The scanning apparatus of claim 27 wherein the curved field comprises a first and a second plate coaxially arranged with respect to each other.

42. The scanning apparatus of claim 27 wherein the field has a width dimension associated therewith further comprising:
a neutral density optical filter disposed intermediate the curved field and the photodetector assembly the filter having a density gradient adapted to make the response of the photodetector assembly uniform across the width dimension of the field.

43. In a laser scanning apparatus of the type having
a curved field for receiving a radiograph to be scanned,
a source of interrogating radiation,
means for producing a focussed scanning beam of interrogating radiation onto the radiograph,
a gantry for mounting the source and beam producing means, and
means for relatively displacing the gantry with respect to the field so as to cause the beam to scan the field in raster fashion, a photodetector assembly positioned with respect to the field to receive radiation transmitted through the radiograph, wherein the improvement comprises the photodetector assembly itself comprising:

a transparent block having a front input end surface, a back reflecting surface, and a first and a second side surface; and a photodetector device mounted in light transmissive engagement with the first side surface, the second side surface having means for directing light to the photodetector device;

the input end surface being curvilinear in shape with all points on the curvilinear surface being equally spaced from the field, the back reflecting surface being shaped and arranged to reflect light incident thereon to the directing means.

44. The scanning apparatus of claim 43 wherein the back surface is shaped such that the intersection of the back surface and a plane extending perpendicular to the second side surface defines a straight line.

45. The scanning apparatus of claim 43 wherein the back surface is shaped such that the intersection of the back surface and a plane extending perpendicular to the second side surface defines a conic section.

46. The scanning apparatus of claim 45 wherein the second side surface, which, when viewed in a direction parallel to an axis erected perpendicular to the second side surface, has a perimeter comprised of a circular arc and an arc of a conic section.

47. The scanning apparatus of claim 44 wherein the second side surface, which, when viewed in a direction parallel to an axis erected perpendicular to the second side surface, has a perimeter comprised of a circular arc and an arc of a conic section.

48. The scanning apparatus of claim 43 wherein the second side surface, which, when viewed in a direction parallel to an axis erected perpendicular to the second side surface, has a perimeter comprised of a circular arc and an arc of a conic section.

49. The scanning apparatus of claim 48 wherein the conic section is an ellipse, the portion of the arc of the ellipse included in the perimeter of the block surrounds a focus thereof, and wherein the directing means is substantially centered on a line perpendicular to the second side surface intersecting the focus of the ellipse.

50. The scanning apparatus of claim 47 wherein the conic section is an ellipse, the portion of the arc of the ellipse included in the perimeter of the block surrounds a focus thereof, and wherein the directing means is substantially centered on a line perpendicular to the second side surface intersecting the focus of the ellipse.

51. The scanning apparatus of claim 46 wherein the conic section is an ellipse, the portion of the arc of the ellipse included in the perimeter of the block surrounds a focus thereof, and wherein the directing means is substantially centered on a line perpendicular to the second side surface intersecting the focus of the ellipse.

52. The scanning apparatus of claim 43 wherein the transparent block is a segment of an ellipsoid, the segment of the ellipsoid being produced by the intersection of the ellipsoid with two parallel planes and a right circular cylinder, one of the planes containing both of the foci of the ellipsoid and part of the second side surface, the other plane forming the first side surface of the block, the directing means being substantially centered on a line perpendicular to the second side surface and intersecting one of the foci of the ellipsoid, the axis of the cylinder being perpendicular to both planes and passing through the other of the foci of the ellipsoid, the radius of the cylinder being less than the distance between the foci.

53. The scanning apparatus of claim 52 wherein the photodetector device is mounted to the first side surface substantially centered on the line perpendicular to the second side surface and intersecting the focus of the ellipsoid.

54. The scanning apparatus of claim 53 wherein the curved field comprises a first and a second plate coaxially arranged with respect to each other.

55. The scanning apparatus of claim 51 wherein the curved field comprises a first and a second plate coaxially arranged with respect to each other.

56. The scanning apparatus of claim 50 wherein the curved field comprises a first and a second plate coaxially arranged with respect to each other.

57. The scanning apparatus of claim 43 wherein the curved field comprises a first and a second plate coaxially arranged with respect to each other.

58. The scanning apparatus of claim 43 wherein the directing means comprises an indentation coated with a reflective material.

59. The scanning apparatus of claim 58 wherein the indentation has a truncated cone shape.

60. The scanning apparatus of claim 43 wherein the field has a width dimension associated therewith, further comprising:

a neutral density optical filter disposed intermediate the curved field and the photodetector assembly, the filter having a density gradient adapted to make the response of the photodetector assembly uniform across the width dimension of the field.

61. The scanning apparatus of claim 59 wherein the truncated cone indentation is defined by a circular area, a circular perimeter and a conical surface intermediately connecting the circular area and the circular perimeter, the conical surface being at an angle in the range of 50 through 70 degrees from an axis of the truncated cone indentation.

* * * * *